United States Patent
Liu et al.

(10) Patent No.: US 12,488,819 B2
(45) Date of Patent: Dec. 2, 2025

(54) DUMMY WORDLINE CONTACTS TO IMPROVE ETCH MARGIN OF SEMI-ISOLATED WORDLINES IN STAIRCASE STRUCTURES

(71) Applicant: Intel NDTM US LLC, Santa Clara, CA (US)

(72) Inventors: Liu Liu, Dalian (CN); CHuan Sun, Dalian (CN); Hong Ma, Singapore (SG)

(73) Assignee: Intel NDTM US LLC, Santa Clara, CA (US)

( * ) Notice: Subject to any disclaimer, the term of this patent is extended or adjusted under 35 U.S.C. 154(b) by 850 days.

(21) Appl. No.: 17/763,172

(22) PCT Filed: Dec. 12, 2019

(86) PCT No.: PCT/CN2019/124882
§ 371 (c)(1),
(2) Date: Mar. 23, 2022

(87) PCT Pub. No.: WO2021/114178
PCT Pub. Date: Jun. 17, 2021

(65) Prior Publication Data
US 2022/0406352 A1 Dec. 22, 2022

(51) Int. Cl.
*H10B 43/27* (2023.01)
*G11C 8/14* (2006.01)
(Continued)

(52) U.S. Cl.
CPC ............... *G11C 8/14* (2013.01); *H10B 41/10* (2023.02); *H10B 41/27* (2023.02); *H10B 41/35* (2023.02)

(58) Field of Classification Search
CPC ..................................................... H10B 43/20
See application file for complete search history.

(56) References Cited

U.S. PATENT DOCUMENTS

2007/0224795 A1* 9/2007 Chen ................ H01L 21/76811
257/E21.583
2015/0349109 A1 12/2015 Lee
(Continued)

FOREIGN PATENT DOCUMENTS

| CN | 105321924 A | 2/2016 |
| CN | 109309095 A | 2/2019 |

OTHER PUBLICATIONS

Extended European Search Report for Patent Application No. 19956094.7, Mailed Jul. 7, 2023, 8 pages.
(Continued)

*Primary Examiner* — Christopher A Johnson
(74) *Attorney, Agent, or Firm* — Morgan, Lewis & Bockius LLP

(57) ABSTRACT

A memory device with a three-dimensional (3D) staircase memory stack includes dummy connectors proximate semi-isolated connectors. The memory device includes multiple wordlines stacked in a 3D staircase stack, which includes a wordline at an edge of a region of the staircase. The memory device includes vertical connectors through an isolation layer on the 3D staircase stack to connect the wordlines with conductive lines in an access layer. A wordline at the edge of the region of the staircase has a vertical connector that will be adjacent a connector on one side and not on the other side. The memory device includes at least one dummy vertical connector on the edge side of the vertical connector of the wordline on the edge, wherein the dummy vertical connector does not electrically connect a wordline of the 3D staircase stack to a conductive line in the access layer.

20 Claims, 10 Drawing Sheets

(51) Int. Cl.
 H10B 41/10 (2023.01)
 H10B 41/27 (2023.01)
 H10B 41/35 (2023.01)

(56) References Cited

U.S. PATENT DOCUMENTS

| | | | |
|---|---|---|---|
| 2016/0005759 A1 | 1/2016 | Kim et al. | |
| 2016/0343727 A1 | 11/2016 | Kim et al. | |
| 2019/0035733 A1* | 1/2019 | Park | H10B 43/27 |
| 2019/0042498 A1* | 2/2019 | Morris | G06F 13/1684 |
| 2019/0198523 A1 | 6/2019 | Nakanishi et al. | |
| 2020/0227429 A1 | 7/2020 | Ji et al. | |
| 2021/0005623 A1* | 1/2021 | Kim | G11C 5/025 |

OTHER PUBLICATIONS

International Search Report and Written Opinion for PCT Patent Application No. PCT/CN2019/124882, Mailed Sep. 16, 2020, 9 pages.
Korean Notice of Preliminary Rejection with English Summary for Patent Application No. 10-2022-7008622, Mailed Dec. 18, 2024, 8 pages.

* cited by examiner

DUMMY WORDLINE CONTACTS TO
IMPROVE ETCH MARGIN OF
SEMI-ISOLATED WORDLINES IN
STAIRCASE STRUCTURES

CLAIM OF PRIORITY

This application is a U.S. National Phase application under 35 U.S.C. § 371 of International Application No. PCT/CN2019/124882 filed Dec. 12, 2019, entitled "DUMMY WORDLINE CONTACTS TO IMPROVE ETCH MARGIN OF SEMI-ISOLATED WORDLINES IN STAIRCASE STRUCTURES" which is incorporated in its entirety herewith.

FIELD

Descriptions are generally related to three dimensional (3D) circuit processing, and more particular descriptions are related to dummy wordline contacts in a staircase region of a 3D circuit.

BACKGROUND

Three-dimensional (3D) NAND (not AND) technologies are commonly used to create nonvolatile (NV) storage devices, such as solid state drives (SSDs). Reference to 3D NAND can more specifically refer to NAND flash. With 3D NAND processes, the storage array is often created with the wordlines in a staircase structure, with vertical connector pillars connecting a top connection layer to the wordlines. Increased 3D NAND densities are achieved with smaller process geometries and feature spacing. As a result, some devices will be densely packed while some vertical pillars will be semi-isolated.

Semi-isolated vertical pillars or semi-isolated wordline connectors have a more tapered profile relative to non-isolated contacts. The increased tapering can lead to either under-etch where the contact fails to make contact with the target wordline layer, or over-etch/punch-through where the contact etches through the wordline into other layers.

A semi-isolated contact tends to have less uniform polymer deposition during etch as compared to wordline contacts with correct profiles that make proper connection between the upper contact layer and the target wordline. Non-isolated contacts that make proper contact can be referred to as normal wordline contacts. The nonuniform polymer deposition of a semi-isolated wordline contact can be due to a micro loading effect of high aspect ratio etches as the connector pillars are more densely packed, leading to increased material/process differences with respect to pillars that are semi-isolated. The semi-isolated pillars end up having different etch characteristics. Thus, semi-isolated wordline contacts have worse taper and less process margin as compared to normal wordline contacts, resulting in process differences where the vertical pillars do not make expected contact.

Traditional processes use dry etch process tuning, which sacrifices poly selectivity by less polymer deposition during etch. This significantly reduces the process margin of the etch between under-etch and over-etch. Making the process very difficult to sustain.

The traditional processes attempt to tune the critical dimension (CD) sizing of the center process to make both non-isolated and semi-isolated contacts have sufficient characteristics for good device yield. The device yield is necessary for successful high volume manufacturing (HVM). However, continuing to tune the center process to provide adequate etch characteristics for both semi-isolated and dense wordline contacts is harder with scale up. As the etch depth increases with more layers as the aspect ratio tolerance goes down due to smaller critical dimensions, the process becomes more sensitive to the balance between polymer deposition and etch.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

As described herein, a memory device with a three-dimensional (3D) staircase memory stack includes dummy connectors close to semi-isolated connectors. A semi-isolated connector connects to a wordline at an edge of the 3D staircase or where the density of connector pillars is lower relative to a higher-density area of pillars that will be etched with the same semiconductor processing. A semi-isolated connector has different etch characteristics than non-isolated connectors because of the lower density of neighboring connectors. Alternatively, any connector that tends to have etch processing characteristics significantly different from a center process, resulting in either over-etch or under-etch of the connector pillar can be considered a semi-isolated connector. In one example, a semi-isolated connector refers to a connector that has an adjacent connector on one side but not the other side.

The vertical connectors reach through an isolation layer on the 3D staircase stack to connect the wordlines with conductive lines in an access layer. The memory device includes at least one dummy vertical connector on a side of the semi-isolated connector. The memory device can include multiple dummy connectors around the semi-isolated connector. A dummy vertical connector reaches into the isolation layer, but may or may not electrically connect a wordline of the 3D staircase stack to a conductive line in the access layer. In one example, a dummy vertical connector connects to a wordline but does not connect to a top connector or conductive line. In one example, a dummy vertical connector connects to the top connector or conductive line but does not connect to a wordline. In general, a dummy vertical connector extends into or through at least some of the isolation layer but does not provide an electrical connection between the wordline and the top connector or conductive line.

The dummy connector changes the etch characteristics of the connector that would be semi-isolated without the dummy connector. Even though the dummy connector does not provide a connection between the wordline and the conductive line in the access layer, it causes a semi-isolated connector to have characteristics closer to the center process. Thus, it can improve the taper and the process margin. As a result, the semi-isolated contact will be less prone to under-etch or over-etch/punch through. Traditionally, a semi-isolated wordline contact has a critical dimension that is smaller compare to normal wordline contacts. With one or more dummy contacts, the dimensions of the contact will be closer to the normal wordline contacts.

Figure 1:
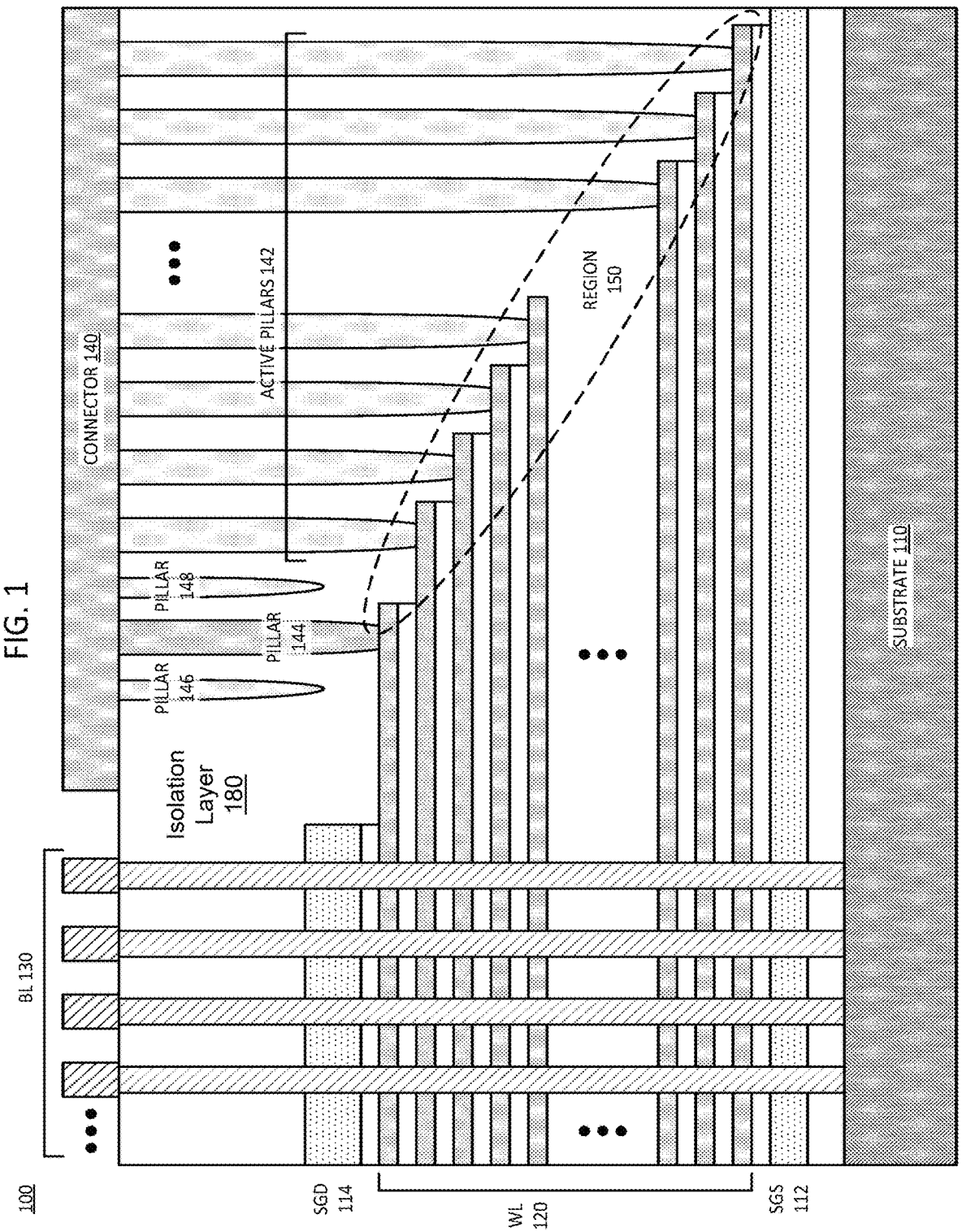
FIG. 1 is a representation of an example of a cross section of a circuit with a staircase region having dummy connector pillars.

FIG. 1 is a representation of an example of a cross section of a circuit with a staircase region having dummy connector pillars. Circuit 100 represents a portion of a memory device having a staircase region of a nonvolatile (NV) memory. In one example, circuit 100 represents a portion of a 3D NAND memory, such as a 3D NAND flash device. In one example, the dummy connectors in circuit 100 could be applied to a 3DXP (3D crosspoint) memory or other stacked memory. It will be understood that certain features in circuit 100 are not necessarily drawn to scale. Rather, certain features are emphasized while others are de-emphasized.

Circuit 100 includes substrate 110, which represents a semiconductor surface on which the 3D memory structure is built. In one example, for a 3D structure, circuit 100 includes a select gate source layer SGS 112, or equivalent. Additionally, circuit 100 can include a select gate drain layer SGD 114 as a drain for the memory layers.

The memory structures are formed in the layers between SGS 112 and SGD 114 in the layers of wordlines (WL) 120. The number of layers of WL 120 can be different for different memory devices. Layers of WL 120 form a 3D stack of bitcells or storage cells. In general, the wordlines are activated in response to a row address for a memory access operation (e.g., read or write). Circuit 100 includes bitlines (BL) 130 that are charged in response to a column address for the memory access operation. WL 120 connect to multiple rows of bitcells, and BL 130 select individual bits or bitcells of the selected row or rows. The orientation of the stack of WL 120 can vary based on perspective. For example, the wordline at the top of the stack or top layer of the stack can be considered a first wordline near an edge of staircase region 150. In one example, the wordline at the bottom of the stack or bottom layer of the stack can be considered the first wordline.

As illustrated, BL 130 go into the page in circuit 100 and WL 120 go from left to right on the page. BL 130 and WL 120 are orthogonal to each other. In one example, the bitcells are at the intersection of a BL and a WL. In one example, BL 130 has vertical columns or channels through layers of WL 120. In one example, a NV media includes a bitcell at an overlap of a bitline and a wordline. If such a device has semi-isolated wordline contacts as described, the use of dummy contacts can be used in a such a structure.

Region 150 illustrates the staircase structure of circuit 100. The staircase structure can be identified as a staircase stack, and refers to the fact that from a cross-section view, using substrate 110 as a reference "floor", a wordline layer above another wordline layer will not extend as far as the one below it. Thus, the wordline layers at the edge appear to have steps up from the wordline closest to substrate 110 to the wordline farthest away from substrate 110.

The staircase region 150 exposes the various wordlines for vertical connection to connector 140. Connector 140 represents a conductive line in a layer that allows electrical access to circuit 100 from external I/O (input/output) for a device in which circuit 100 will be incorporated. In one example, connector 140 represents multiple parallel conductive lines that extend from left to right in the orientation of FIG. 1. The connector lines can be parallel with WLs 120, and orthogonal to BLs 130.

Connector 140 is included in an access layer, and is located at or near a top layer of circuit 100. Connector 140 provides a connection point (e.g., an access contact) for external I/O. Active pillars 142 represent connectors or wordline connectors or pillars that electrically connect one of WL 120 to connector 140. While not specifically illustrated in circuit 100, active pillars 142 (and pillar 144) have very high aspect ratios. A high aspect ratio pillar is a pillar that has a very deep depth relative to its diameter.

Semi-isolated pillar 144 represents an active pillar 142, but at one end of the staircase. More specifically, pillar 144 is illustrated at a top edge of the staircase to connect to a top-most WL 120. In one example, a semi-isolated pillar could be located at a lower edge of the staircase to connect to a bottom-most WL 120. It will be observed that pillar 144 has an adjacent contact to one side, which is an active pillar 142, one level down in the staircase. A semi-isolated pillar at the bottom of the staircase would have an adjacent active pillar one level up the staircase. Pillar 144 does not have an adjacent active pillar on the other side, away from the staircase region 150.

A semi-isolated pillar with dummy pillars could be said to have adjacent pillars. However, it will be understood that the dummy pillars are not active pillars; thus, a semi-isolated pillar can be described in reference to having an adjacent active pillar on one side and not having or lacking an adjacent active pillar on the other side. In one example, a semi-isolated pillar can be described with reference to connecting to a wordline of the staircase stack that has an adjacent wordline one step up or one step down, but not an adjacent wordline in the other direction of the staircase structure. Thus, in one example, a semi-isolated pillar connects to a wordline that has only a single neighbor in the staircase stack.

In one example, circuit 100 includes one or more dummy pillars adjacent to or close to pillar 144. Dummy pillars do not connect to connector and may or may not connect to a wordline. Thus, dummy pillars can be referred to as a floating pillars or floating contacts. In one example, circuit 100 includes dummy pillar 146, which represents a pillar away from the staircase region with respect to pillar 144. In one example, circuit 100 includes only dummy pillar 146 for pillar 144. Dummy pillar 146 can be considered a first dummy pillar and dummy pillar 148 can be considered a second dummy pillar. Alternatively, dummy pillar 148 can be considered a first dummy pillar and dummy pillar 146 can be considered a second dummy pillar. Circuit 100 could include a third dummy pillar, a fourth dummy pillar, or other dummy pillars (not shown). Dummy pillar 146 is on an opposite side of active pillar 144 from dummy pillar 148; it could be said that the dummy pillars are on opposite sides of each other.

In one example, circuit 100 includes dummy pillar 148, which represents a pillar toward the staircase region with respect to pillar 144. In one example, circuit 100 does not include pillar 148 unless it also includes pillar 146. In one example, circuit 100 can include dummy pillar 148 without dummy pillar 146. In one example, circuit 100 includes at least one dummy pillar 146 and at least one dummy pillar 148.

In one example, dummy pillars or dummy contacts 146 and 148 need to be under-etched. In one example, dummy contacts can be assured to be under-etched relative to active pillars by keeping the diameter of the dummy contact pillars smaller than the diameter of the active contact pillars. It has been found that when dummy pillars 146 and 148 have a diameter about 80% the size of pillar 144, the dummy pillars remain under-etched and provide for better etch characteristics for pillar 144. The sizing of the dummy pillars can vary when more dummy pillars are used.

It will be understood that with the change in structure for circuit 100, dummy pillar 146 or dummy pillar 148, or both dummy pillars 146 and 148, can prevent pillar 144 from being semi-isolated. Thus, the process may not need additional tuning to provide the correct etch characteristics for pillar 144.

Figure 2:
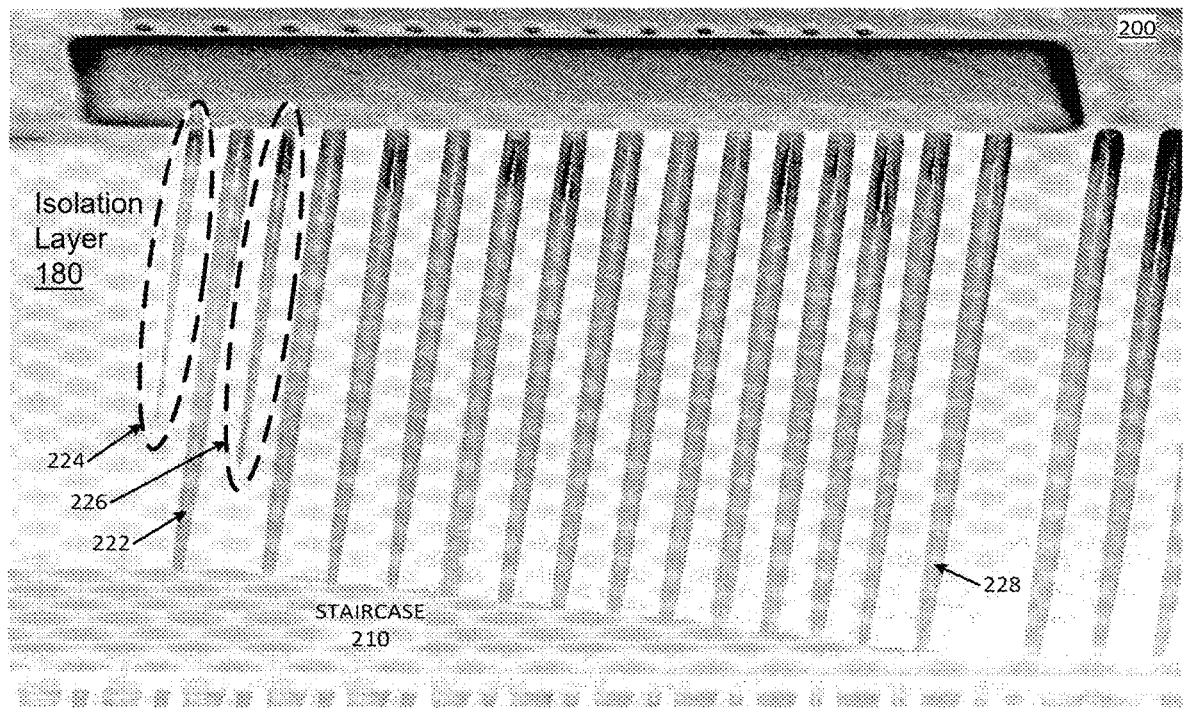
FIG. 2 is a cross-section imaging representation of an example of a circuit with dummy connectors near a semi-isolated contact.

FIG. 2 is a cross-section imaging representation of an example of a circuit with dummy connectors near a semi-isolated contact. Circuit 200 represents a circuit in accordance with circuit 100, as seen with microscopic imaging technology.

Circuit 200 includes connectors (not specifically shown) to connect with wordlines of staircase 210. Staircase 210 represents the area of circuit 200 that includes the storage cells. Between the staircase region and the connectors is an isolation layer 180, such as an oxide or nitride layer. The isolation layer 180 provide electrical isolation between the storage cells and the conductive lines at the top of the circuit that provide access to external device I/O.

The wordlines are very thin relative to the width of the pillars. In one example, contact 222 represents a semi-isolated pillar or semi-isolated contact. Contact 222 connects a wordline at the top of staircase 210 to the connectors. In one example, contact 228 could also be a semi-isolated contact. Some processing generates devices with contacts at both the top of the staircase and the bottom of the staircase that may not etch properly. Both top and bottom WL contacts could demonstrate strong pitch dependency.

In one example, circuit 200 includes dummy contacts 224 and 226 close to contact 222. No dummy contacts are shown close to contact 228, but it will be understood that such dummy contacts could be used. Dummy contacts 224 and 226 near contact 222 can eliminate the systematic weak site for wordline contact etch characteristics. In one example, the dummy contacts can improve process margin for the wordline contact etch, which improves yield and reduces process complexity.

Dummy contacts 224 and 226 can be referred to as floating contacts because they do not extend all the way through the isolation layer to the staircase. In the specific implementation of circuit 200, dummy contact 224 on the isolated side of contact 222 does not extend as far as dummy contact 226 on the non-isolated side. In one example, they can be the same or approximately the same depth.

It will be observed that dummy contacts 224 and 226 have narrower diameter or smaller diameter than the active pillars, as seen by the pillar size at the connectors. It will also be observed that the dummy contacts have significantly more taper than the active contacts.

Figure 3:
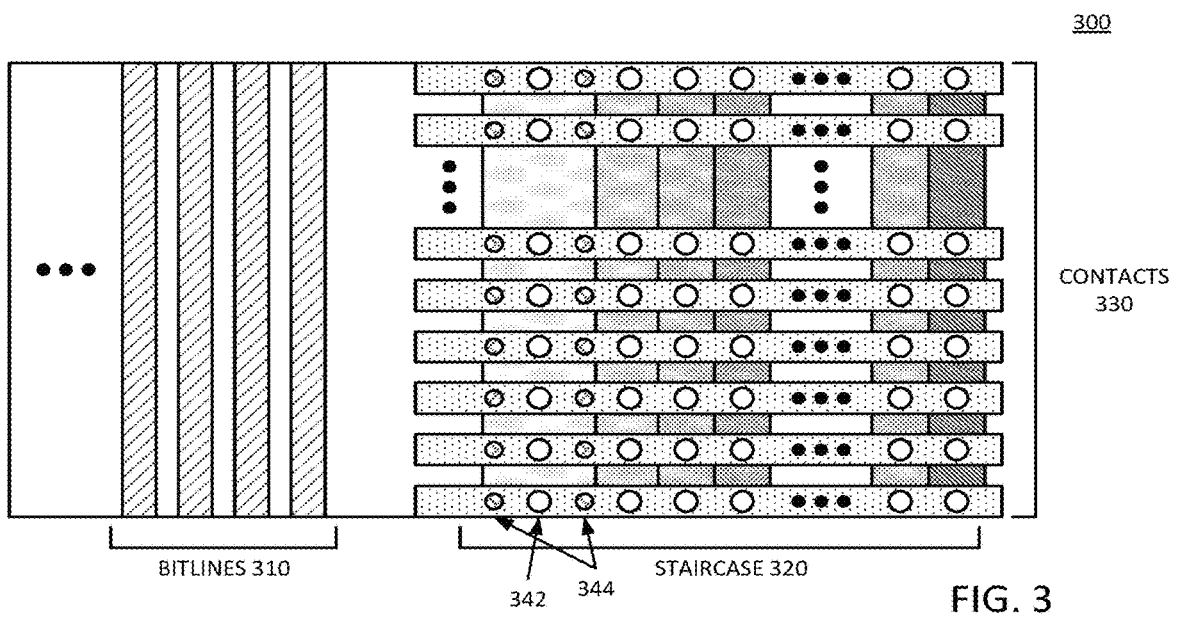
FIG. 3 is a representation of an example of a top view of a circuit with dummy connectors.

FIG. 3 is a representation of an example of a top view of a circuit with dummy connectors. Diagram 300 illustrates a top view of an example of a circuit in accordance with circuit 100 of FIG. 1. Diagram 300 can be considered layout of circuit features for the staircase region of the memory device.

The top view illustrates the orientation of the different portions of the circuit. In diagram 300, bitlines 310 run up and down in the orientation of the figure. Contacts 330 run right to left, orthogonal to bitlines 310. The wordlines are not specifically shown, but would be parallel to contacts 330, and could run under them. Contacts 330 can represent connectors that connect to active wordlines.

Rather than specifically showing the wordlines, diagram 300 illustrates staircase 320 with different shading to represent different levels of the staircase region. In diagram 300, the vertical contact pillars are represented as circles on the contact conductive lines. Not all connectors necessarily connected to all wordlines at all circles represented. The connections depend on the architecture of the underlying wordline layout, as well as the architecture of the connector conductive lines. However, the circles illustrate where connections could be made. In one example, a single contact connects to multiple places in the staircase. In one example, a contact connects to a single place on the staircase.

Diagram 300 illustrates semi-isolated active contact 342, which can be any contact along the same step of staircase 320. Possible locations for other active contacts are also illustrated. Diagram 300 includes a representation of dummy contacts 344. While not necessarily to scale, it will be understood that the dummy contacts have a smaller diameter than semi-isolated active contact 342. Dummy contacts 344 connect to the upper layer connector, but do not connect to a wordline in the 3D staircase stack.

Figure 4A:
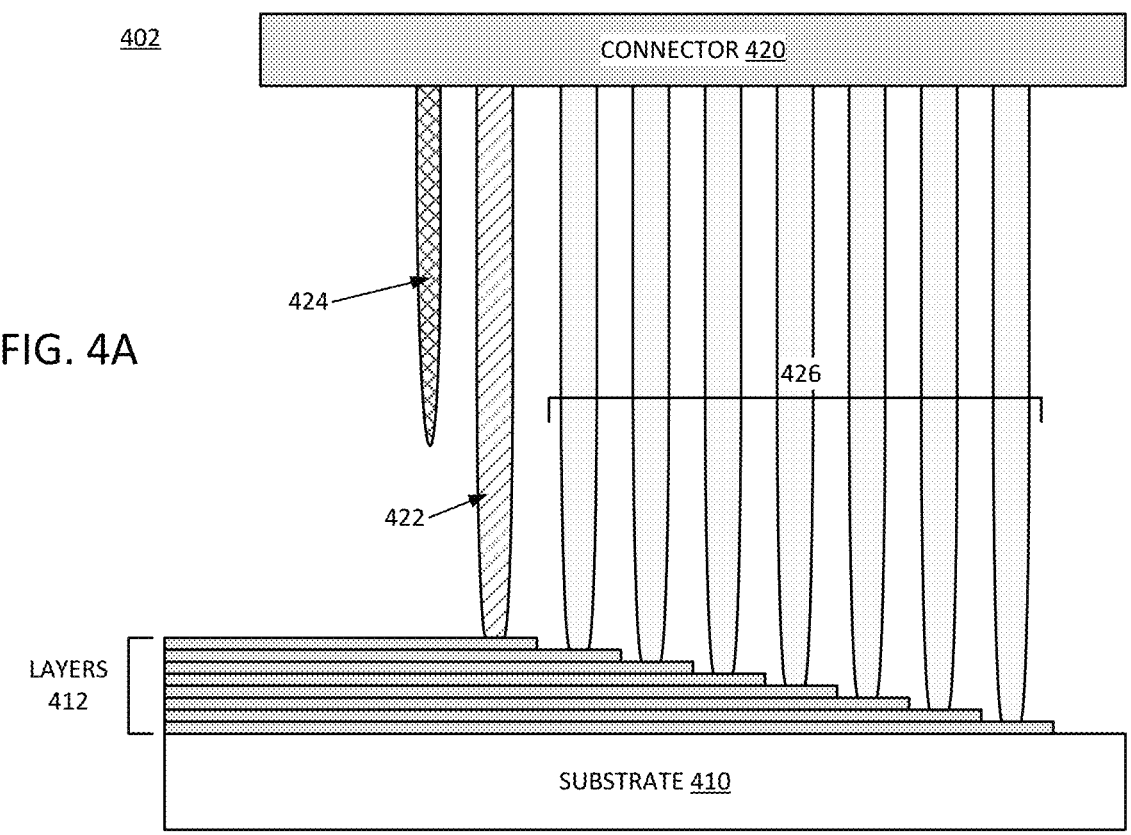
FIG. 4A is a representation of an example of a cross section of a circuit with a dummy connector on the isolated side of a semi-isolated connector.

FIG. 4A is a representation of an example of a cross section of a circuit with a dummy connector on the isolated side of a semi-isolated connector. Circuit 402 represents an example of a circuit in accordance with circuit 100 of FIG. 1. Circuit 402 includes substrate 410 on which the circuit is built. Layers 412 represent wordline layers and provide the 3D staircase stack for circuit 402.

Active contacts 426 connect connector(s) 420 to wordlines of layers 412. Contact 422 represents a semi-isolated contact. Dummy contact 424 represents a dummy contact. Dummy contact 424 is a dummy contact on the isolated side of contact 422. Thus, dummy contact 424 is on the side of contact 422 where there are not other active contacts.

It will be understood that the number of contacts and layers 412 are for purposes of illustration and are not necessarily representative of an actual system; rather, there could be more or fewer layer and associated contacts in circuit 402. In the example of circuit 402, contact 422 is at the top of the staircase. In another implementation, the contact at the bottom of the staircase could be the semi-isolated contact.

Figure 4B:
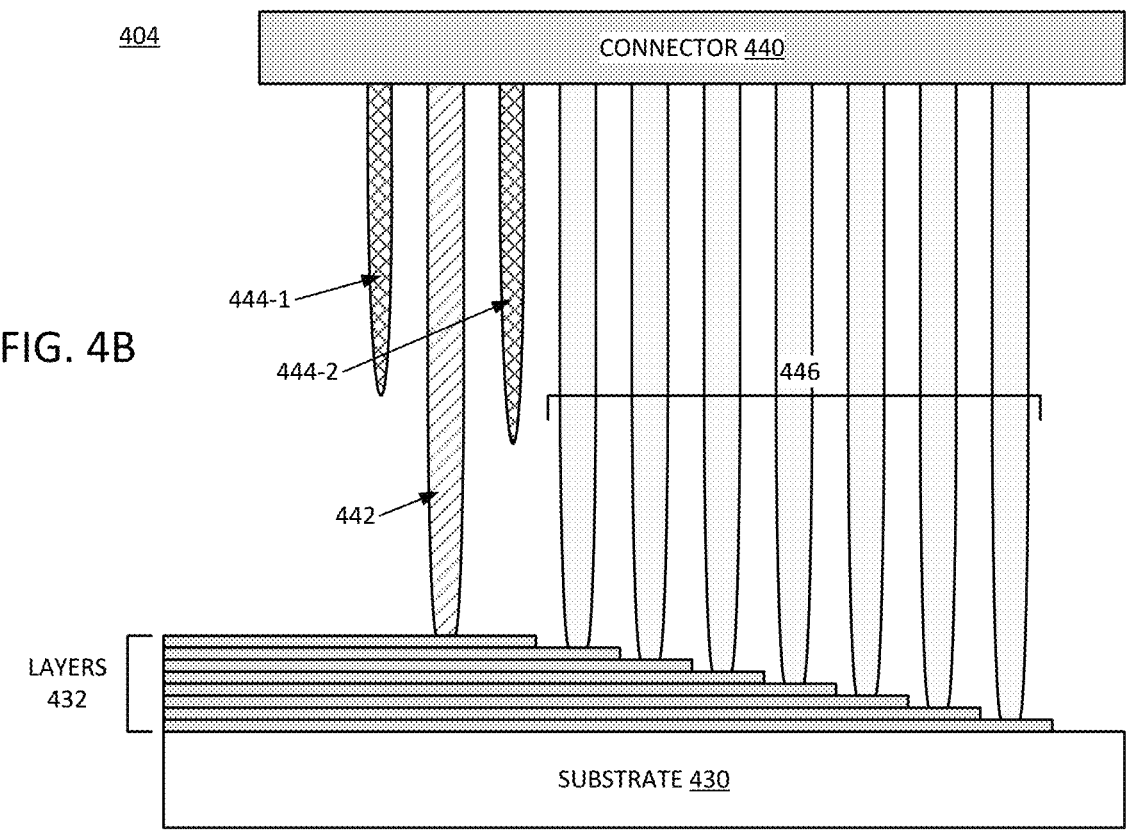
FIG. 4B is a representation of an example of a cross section of a circuit with a dummy connector on either side of a semi-isolated connector.

FIG. 4B is a representation of an example of a cross section of a circuit with a dummy connector on either side of a semi-isolated connector. Circuit 404 represents an example of a circuit in accordance with circuit 100 of FIG. 1. Circuit 404 includes substrate 430 on which the circuit is built. Layers 432 represent wordline layers and provide the 3D staircase stack for circuit 404.

Active contacts 446 connect connector(s) 440 to wordlines of layers 432. Contact 442 represents a semi-isolated contact. Dummy contacts 444-1 and 444-2 represent dummy contacts. Dummy contact 444-1 is a dummy contact on the isolated side of contact 442, while dummy contact 444-2 is a dummy contact on the non-isolated side of contact 442. Thus, dummy contact 444-1 is on the side of contact 442 where there are not other active contacts and dummy contact 444-2 is on the side of contact 442 where there are other active contacts.

It will be understood that the number of contacts and layers 432 are for purposes of illustration and are not necessarily representative of an actual system; rather, there could be more or fewer layer and associated contacts in circuit 404. In the example of circuit 404, contact 442 is at the top of the staircase. In another implementation, the contact at the bottom of the staircase could be the semi-isolated contact.

Figure 4C:
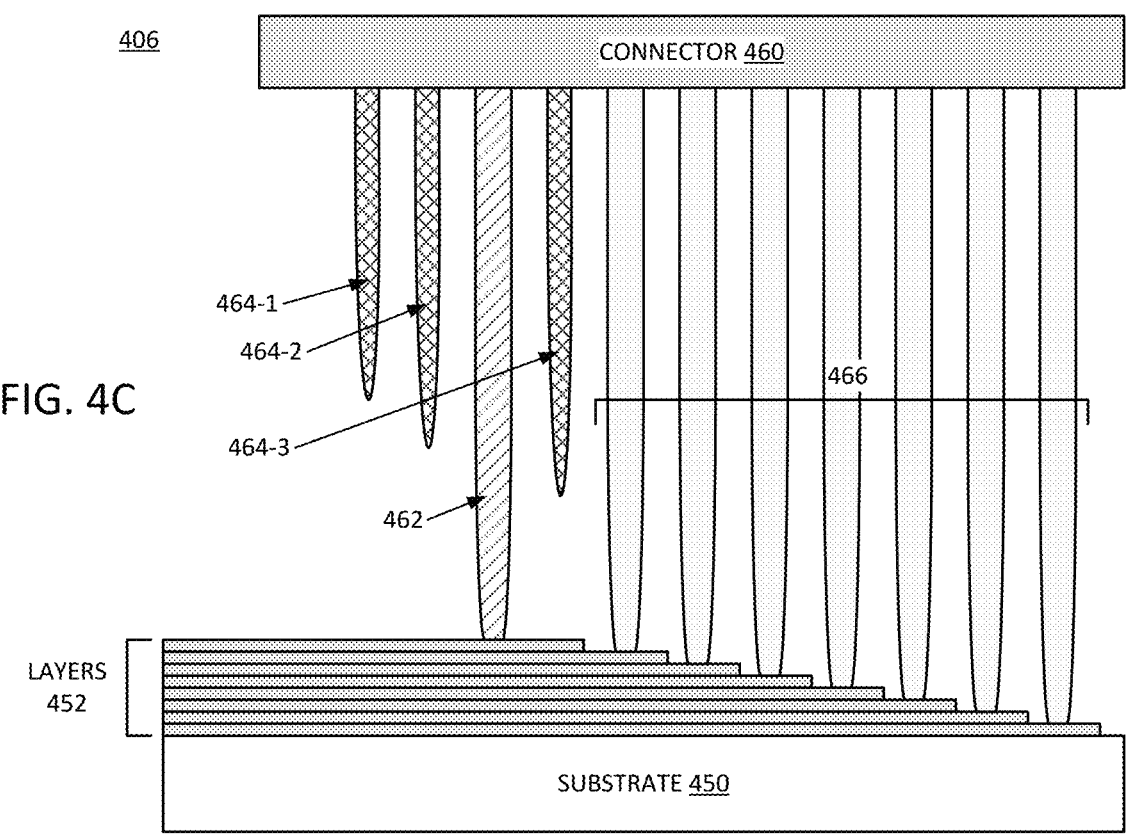
FIG. 4C is a representation of an example of a cross section of a circuit with multiple dummy connectors on the isolated side of a semi-isolated connector.

FIG. 4C is a representation of an example of a cross section of a circuit with multiple dummy connectors on the isolated side of a semi-isolated connector. Circuit 406 represents an example of a circuit in accordance with circuit 100 of FIG. 1. Circuit 406 includes substrate 450 on which the circuit is built. Layers 452 represent wordline layers and provide the 3D staircase stack for circuit 406.

Active contacts 466 connect connector(s) 460 to wordlines of layers 452. Contact 462 represents a semi-isolated contact. Dummy contacts 464-1, 464-2, and 464-3 represent dummy contacts. Dummy contact 464-1 and dummy contact 464-2 are dummy contacts on the isolated side of contact 462, where there are not other active contacts. Dummy contact 464-3 is a dummy contact on the non-isolated side of contact 462, where there are other active contacts. Thus, circuit 406 includes two dummy contacts on the isolated side and one dummy contact on the non-isolated side. More than two floating contacts on the isolated side could be used.

It will be understood that the number of contacts and layers 452 are for purposes of illustration and are not necessarily representative of an actual system; rather, there could be more or fewer layer and associated contacts in circuit 406. In the example of circuit 406, contact 462 is at the top of the staircase. In another implementation, the contact at the bottom of the staircase could be the semi-isolated contact.

Figure 4D:
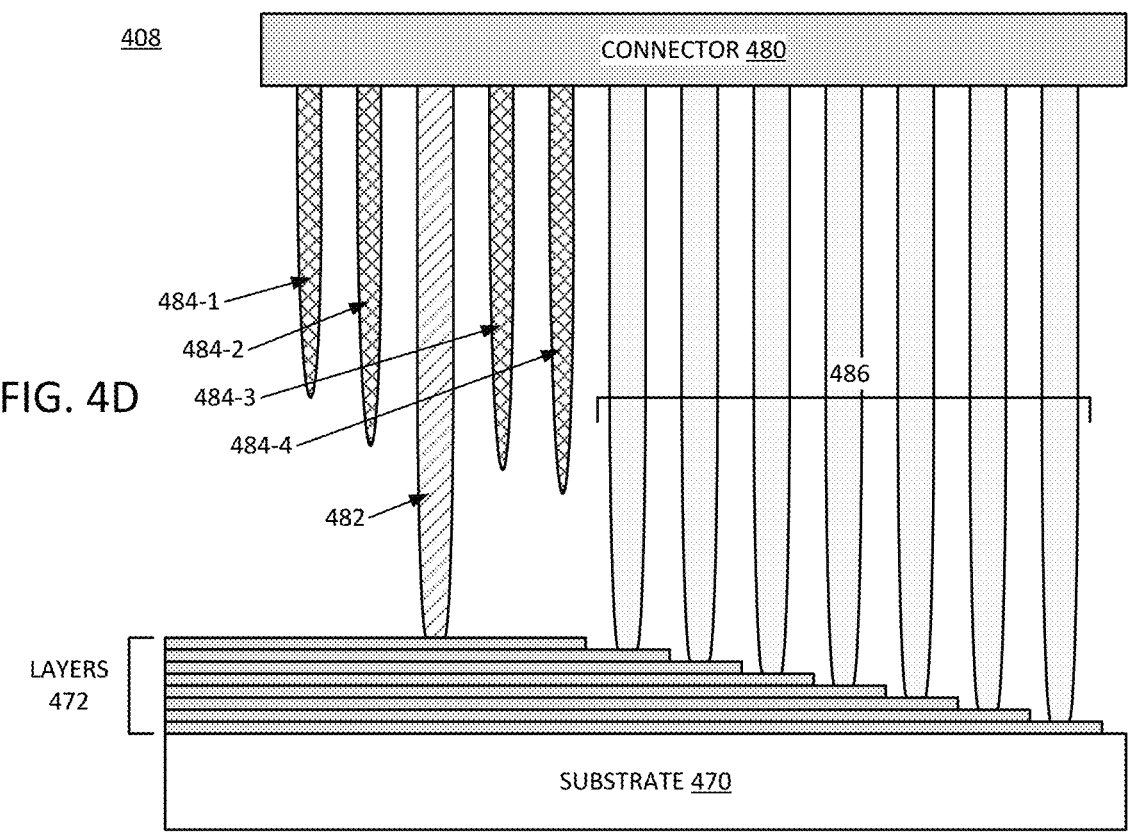
FIG. 4D is a representation of an example of a cross section of a circuit with multiple dummy connector on either side of a semi-isolated connector.

FIG. 4D is a representation of an example of a cross section of a circuit with multiple dummy connector on either side of a semi-isolated connector. Circuit 408 represents an example of a circuit in accordance with circuit 100 of FIG. 1. Circuit 408 includes substrate 470 on which the circuit is built. Layers 472 represent wordline layers and provide the 3D staircase stack for circuit 408.

Active contacts 486 connect connector(s) 480 to wordlines of layers 472. Contact 482 represents a semi-isolated contact. Dummy contacts 484-1, 484-2, 484-3, and 484-4 represent dummy contacts. Dummy contact 484-1 and dummy contact 484-2 are dummy contacts on the isolated side of contact 482, where there are not other active contacts. Dummy contact 484-3 and dummy contact 484-4 are dummy contacts on the non-isolated side of contact 482, where there are other active contacts. Thus, circuit 408 includes two dummy contacts on the isolated side and two dummy contact on the non-isolated side. More than two floating contacts on either side could be used.

It will be understood that the number of contacts and layers 472 are for purposes of illustration and are not necessarily representative of an actual system; rather, there could be more or fewer layer and associated contacts in circuit 408. In the example of circuit 408, contact 482 is at the top of the staircase. In another implementation, the contact at the bottom of the staircase could be the semi-isolated contact.

Figure 5:
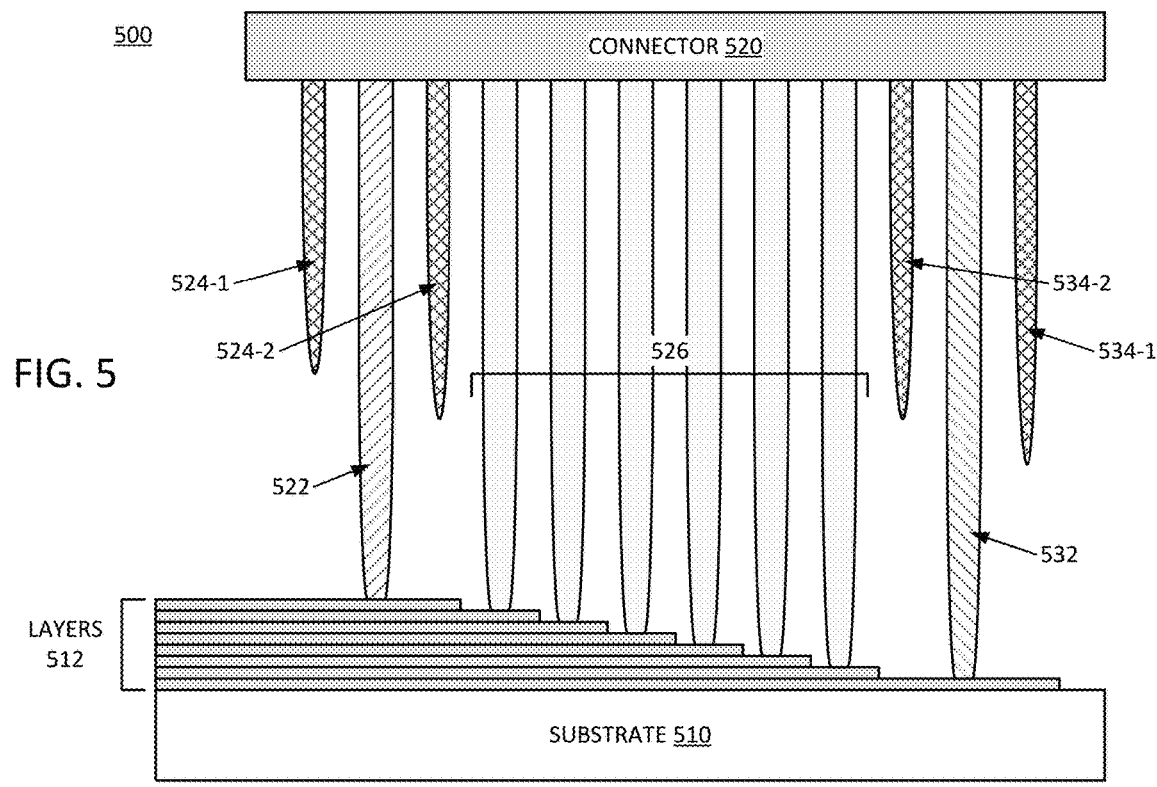
FIG. 5 is a representation of an example of a cross section of a circuit with dummy connectors near semi-isolated connectors in different areas of a staircase region.

FIG. 5 is a representation of an example of a cross section of a circuit with dummy connectors near semi-isolated connectors in different areas of a staircase region. Circuit 500 represents an example of a circuit in accordance with circuit 100 of FIG. 1. Circuit 500 includes substrate 510 on which the circuit is built. Layers 512 represent wordline layers and provide the 3D staircase stack for circuit 500. Circuit 500 illustrates an example with contact 522 at the top of the staircase that could be a semi-isolated contact, and contact 532 at the bottom of the staircase that could be a semi-isolated contact.

Active contacts 526 connect connector(s) 520 to wordlines of layers 512. Dummy contacts 524-1 and 524-2 represent dummy contacts for contact 522. Dummy contact 524-1 is a dummy contact on the isolated side of contact 522. Dummy contact 524-2 is a dummy contact on the non-isolated side of contact 522. Dummy contacts 534-1 and 534-2 represent dummy contacts for contact 532. Dummy contact 534-1 is a dummy contact on the isolated side of contact 532. Dummy contact 534-2 is a dummy contact on the non-isolated side of contact 532. At least one floating contact could be used for both the upper and the lower semi-isolated contact. Either or both could use more than one floating contact in accordance with what is shown in FIGS. 4A-4D.

It will be understood that the number of contacts and layers 512 are for purposes of illustration and are not necessarily representative of an actual system; rather, there could be more or fewer layer and associated contacts in circuit 500.

Figure 6:
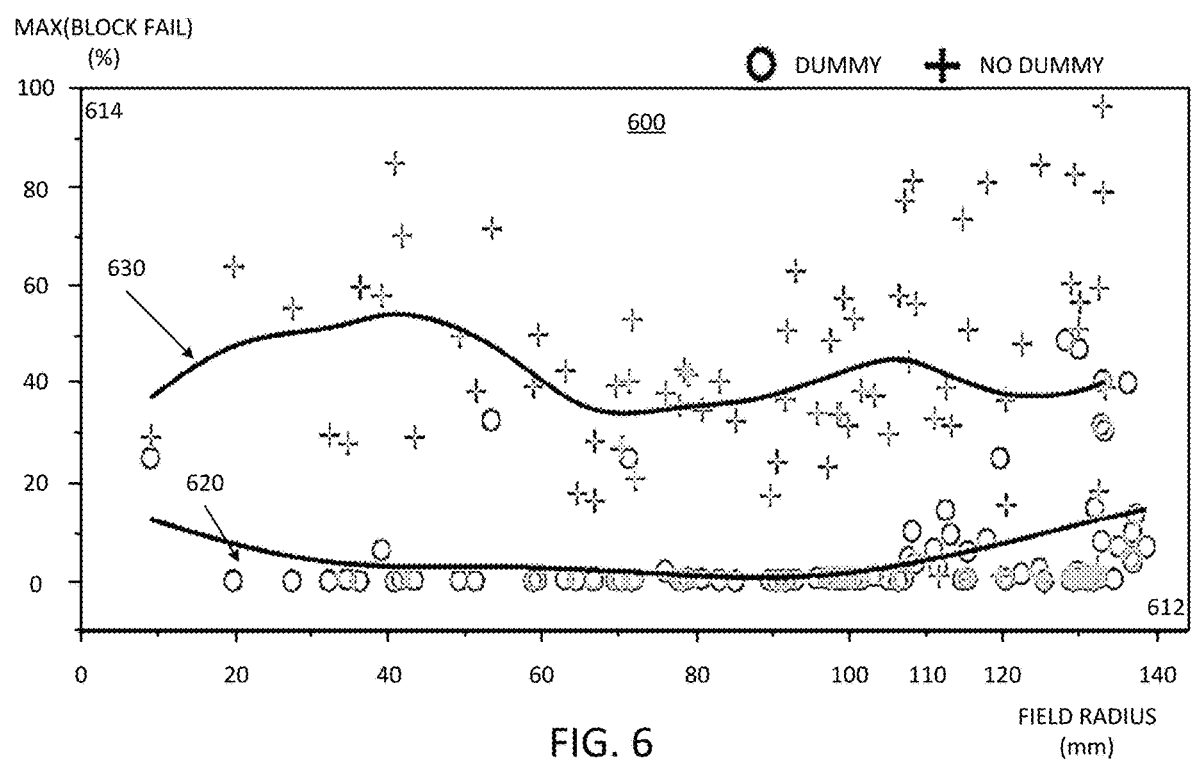
FIG. 6 is a diagrammatic representation of an example of block failures when dummy connectors are used as compared to when dummy connectors are not used.

FIG. 6 is a diagrammatic representation of an example of block failures when dummy connectors are used as compared to when dummy connectors are not used. Diagram 600 illustrates a mapping of testing for circuits with staircase regions. Each plus '+' and each circle 'o' on the graph represent a separate circuit that was tested.

The circuits were testing for failure after processing. The circles represent circuits that were processed with traditional circuit processing. The pluses represent circuits using a layout change to eliminate process weak site; more specifically, the process change is the inclusion of a dummy contact or floating contact. Even more specifically, the circuits marked by the pluses represent circuits having two floating contacts: one on the isolated side of a semi-isolated contact and one on the non-isolated side.

Axis 612 (the x-axis) identifies the size of the wafer used to create the memory devices, and is designated as field radius, from 10 mm up to 140 mm. Axis 614 (the y-axis) identifies the percentage of devices having failures attributable to under-etch or punch through etch.

Curve 620 represents a statistical analysis of the graph points for the circuits with dummy contacts. Curve 630 represents a statistical analysis of the graph points for the circuits without dummy contacts. It will be observed that curve 630 has a failure rate of approximately 40% for radius of 70-130 mm. Curve 620 shows significant improvement with failure rates near zero over the same range. Curve 620 does start to uptick some at about 110 mm, with failure rates rising to approximately 10% at 130 mm. However, the failure rates are significantly lower than for the same process without dummy contacts. Thus, it is concluded that the use of dummy contacts significantly reduces the failure rate.

Figure 7A:
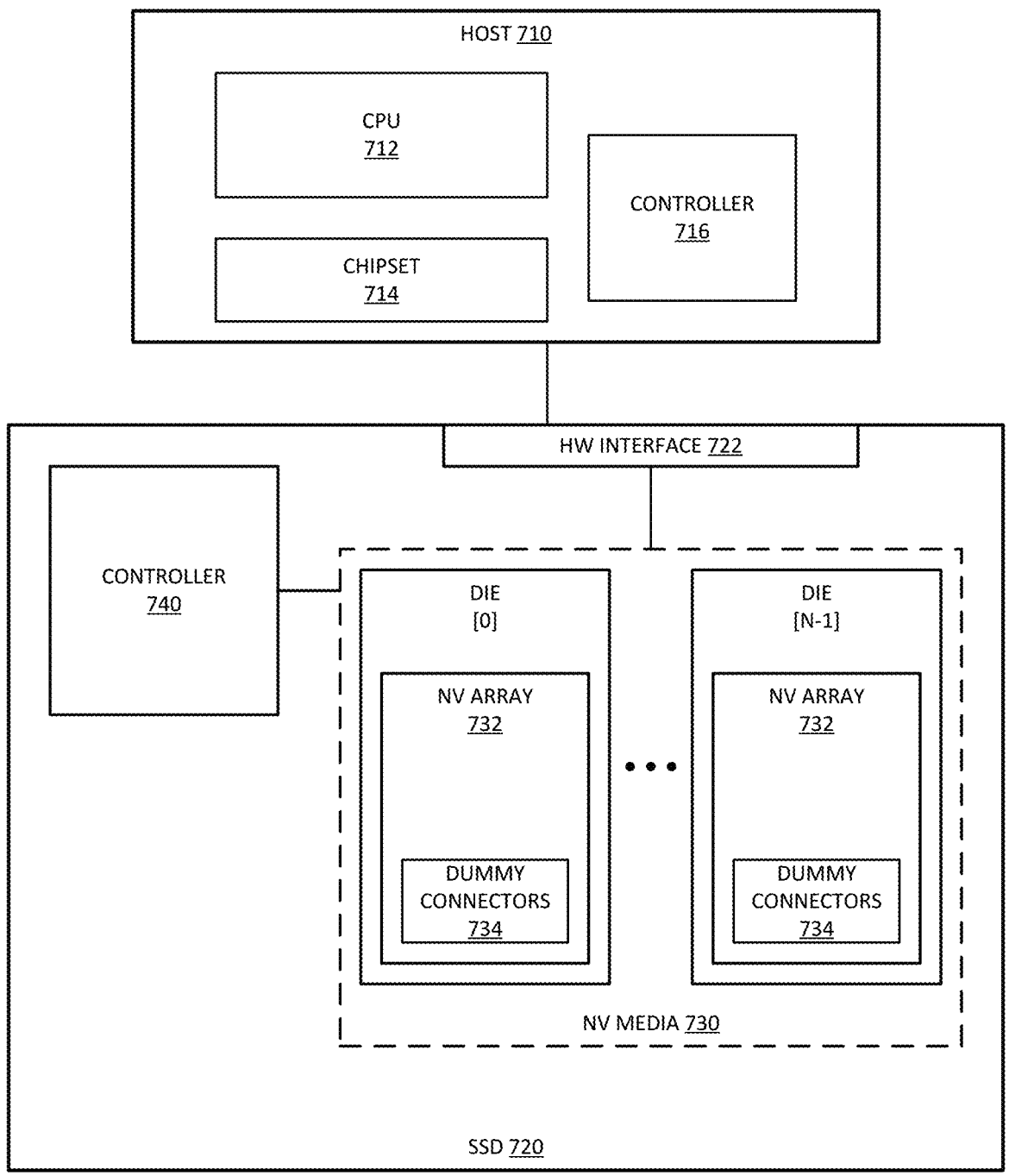
FIG. 7A is a block diagram of an example of a system with a hardware view of a solid state drive (SSD) with a nonvolatile array having dummy connectors.

FIG. 7A is a block diagram of an example of a system with a hardware view of a solid state drive (SSD) with a nonvolatile array having dummy connectors. System 702 represents components of a nonvolatile storage system that could implement nonvolatile media having a staircase structure and floating contacts in accordance with circuit 100 of FIG. 1.

System 702 includes SSD 720 coupled with host 710. Host 710 represents a host hardware platform that connects to SSD 720. Host 710 includes CPU (central processing unit) 712 or other processor as a host processor or host processor device. CPU 712 represents any host processor that generates requests to access data stored on SSD 720, either to read the data or to write data to the storage. Such a processor can include a single or multicore processor, a primary processor for a computing device, a graphics processor, a peripheral processor, or a supplemental or auxiliary processor, or a combination. CPU 712 can execute a host OS and other applications to cause the operation of system 702.

Host 710 includes chipset 714, which represents hardware components that can be included in connecting between CPU 712 and SSD 720. For example, chipset 714 can include interconnect circuits and logic to enable access to SSD 720. Thus, host platform 710 can include a hardware platform drive interconnect to couple SSD 720 to host 710. Host 710 includes hardware to interconnect to the SSD. Likewise, SSD 720 includes corresponding hardware to interconnect to host 710.

Host 710 includes controller 716, which represents a storage controller or memory controller on the host side to control access to SSD 720. In one example, controller 716 is included in chipset 714. In one example, controller 716 is included in CPU 712. Controller 716 can be referred to as an NV memory controller to enable host 710 to schedule and organize commands to SSD 720 to read and write data.

SSD 720 represents a solid-state drive or other storage system or module that includes nonvolatile (NV) media 730 to store data. SSD 720 includes HW (hardware) interface 722, which represents hardware components to interface with host 710. For example, HW interface 722 can interface with one or more buses to implement a high speed interface standard such as NVMe or PCIe.

In one example, SSD 720 includes NV (nonvolatile) media 730 as the primary storage for SSD 720. In one example, NV media 730 is or includes a block addressable memory technology, such as NAND (not AND) or NOR (not OR). In one example, NV media 730 can include a nonvolatile, byte addressable media that stores data based on a resistive state of the memory cell, or a phase of the memory cell. For example, NV media 730 can be or include a three dimensional crosspoint (3DXP) memory or a storage array based on chalcogenide phase change material (e.g., chalcogenide glass). In one example, the NV media can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

In one example, NV media 730 is implemented as multiple dies, illustrated as N dies, Die[0:{N−1}]. N can be any number of devices, and is often a binary number. SSD 720 includes controller 740 to control access to NV media 730. Controller 740 represents hardware and control logic within SSD 720 to execute control over the media. Controller 740 is internal to the nonvolatile storage device or module, and is separate from controller 716 of host 710.

The NV dies of NV media 730 include NV array 732, which is an array of storage cells based on the NV media. NV array 732 includes a staircase structure in accordance with any example herein. In one example, NV array 732 includes dummy connectors 734 in accordance with any description of dummy contacts or floating contacts. Dummy connectors 734 connect to a connection layer but do not extend all the way through an isolation layer to wordlines of the staircase structure.

Figure 7B:
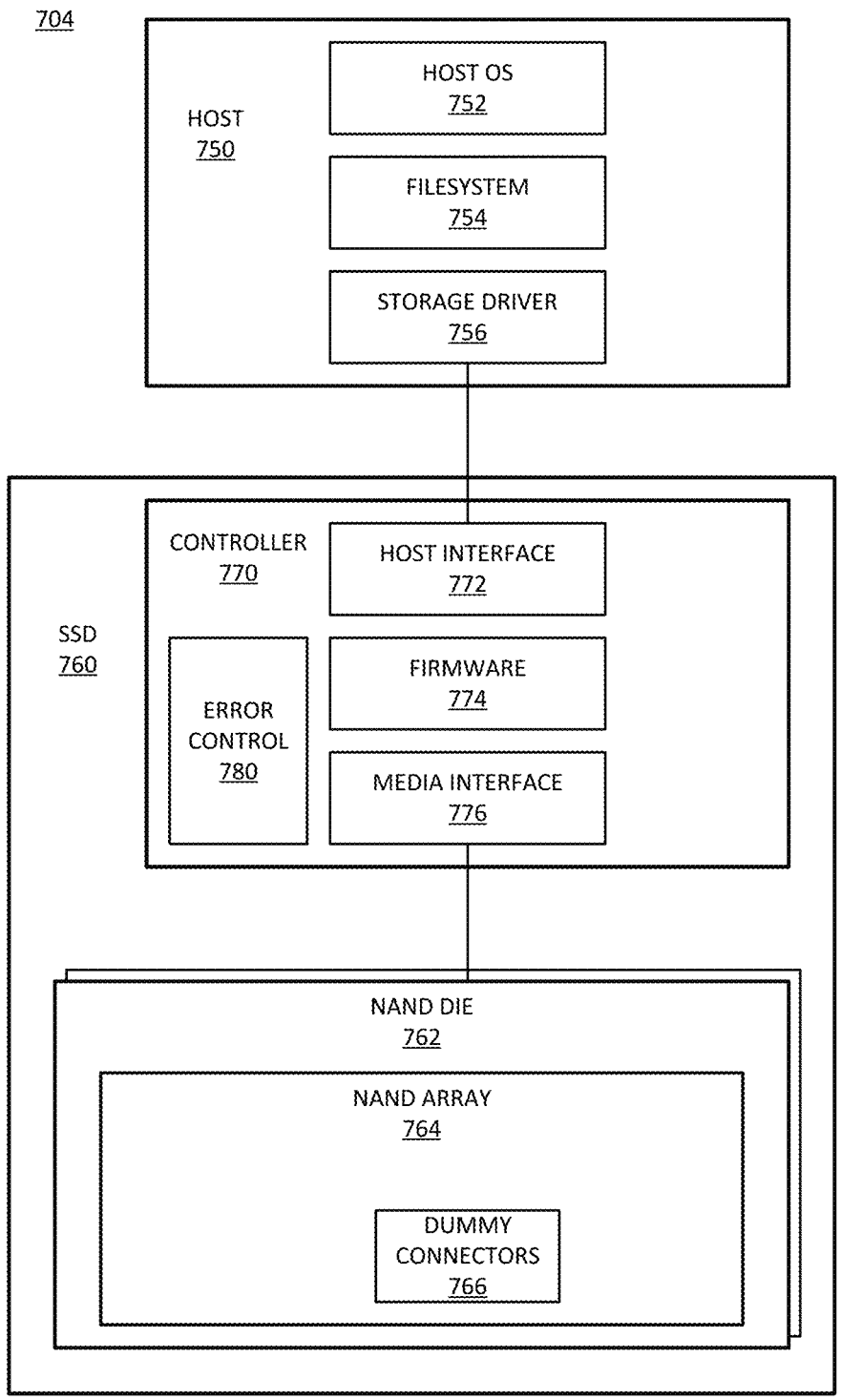
FIG. 7B is a block diagram of an example of a logical view of system with a solid state drive (SSD) with a nonvolatile array having dummy connectors.

FIG. 7B is a block diagram of an example of a logical view of system with a solid state drive (SSD) with a nonvolatile array having dummy connectors. System 704 provides one example of a system in accordance with system 702 of FIG. 7A. System 704 illustrates the logical layers of the host and SSD of a hardware platform in accordance with system 702. System 704 can represent software and firmware components of an example of system 702, as well as physical components. In one example, host 750 provides one example of host 710. In one example, SSD 760 provides one example of SSD 720.

In one example, host 750 includes host OS 752, which represents a host operating system or software platform for the host. Host OS 752 can include a platform on which applications, services, agents, and/or other software executes, and is executed by a processor. Filesystem 754 represents control logic for controlling access to the NV media. Filesystem 754 can manage what addresses or memory locations are used to store what data. There are numerous filesystems known, and filesystem 754 can implement known filesystems or other proprietary systems. In one example, filesystem 754 is part of host OS 752.

Storage driver 756 represents one or more system-level modules that control the hardware of host 750. In one example, drivers 756 include a software application to control the interface to SSD 760, and thus control the hardware of SSD 760. Storage driver 756 can provide a communication interface between the host and the SSD.

Controller 770 of SSD 760 includes firmware 774, which represents control software/firmware for the controller. In one example, controller 770 includes host interface 772, which represents an interface to host 750. In one example, controller 770 includes media interface 776, which represents an interface to NAND die 762. NAND die 762 represents a specific example of NV media, and includes an associated NAND array 764. Dummy connectors 766 represent dummy connectors or dummy contacts in accordance with any example herein. The dummy connectors will be understood to be spread throughout NAND array 764, wherever they are used to reduce the isolation of a semi-isolated wordline contact.

Media interface 776 represent control that is executed on hardware of controller 770. It will be understood that controller 770 includes hardware to interface with host 750, which can be considered to be controlled by host interface software/firmware 774. Likewise, it will be understood that controller 770 includes hardware to interface with NAND die 762. In one example, code for host interface 772 can be part of firmware 774. In one example, code for media interface 776 can be part of firmware 774.

In one example, controller 770 includes error control 780 to handle data errors in accessed data, and corner cases in terms of compliance with signaling and communication interfacing. Error control 780 can include implementations in hardware or firmware, or a combination of hardware and software.

Figure 8:
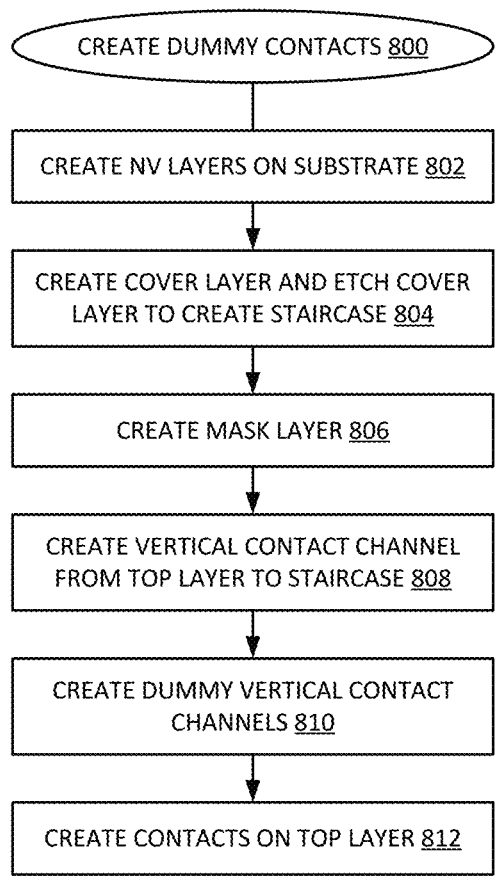
FIG. 8 is a flow diagram of an example of a process for creating a staircase region having dummy connector pillars.

FIG. 8 is a flow diagram of an example of a process for creating a staircase region having dummy connector pillars. Process 800 enables the creation of one or more dummy connectors. It is assumed that there is a separate process to determine whether a dummy connector is needed in a circuit.

In one example, the processing hardware creates NV layers on a substrate, at 802. In a typical process, the layers can initially be planar layers. The layers of material can be covered with a cover layer and the processing hardware etches the cover layer and the underlying NV layers to form or create a staircase structure, at 804. It will be understood that the staircase structure has a region at the top of the staircase and a region at the bottom of the staircase.

In one example, the processing hardware creates a mask layer on the staircase structure, at 806. The processing hardware can then create vertical contact channels from the top layers to the staircase structure, at 808. In one example, the processing hardware creates one or more dummy vertical contacts channels close to semi-isolated vertical connectors, at 810. The creation of the dummy contacts can be performed with the same processing used to create the actual wordline contacts. The processing hardware can connect the vertical connectors to contacts in an upper layer or an access layer, at 812.

Figure 9:
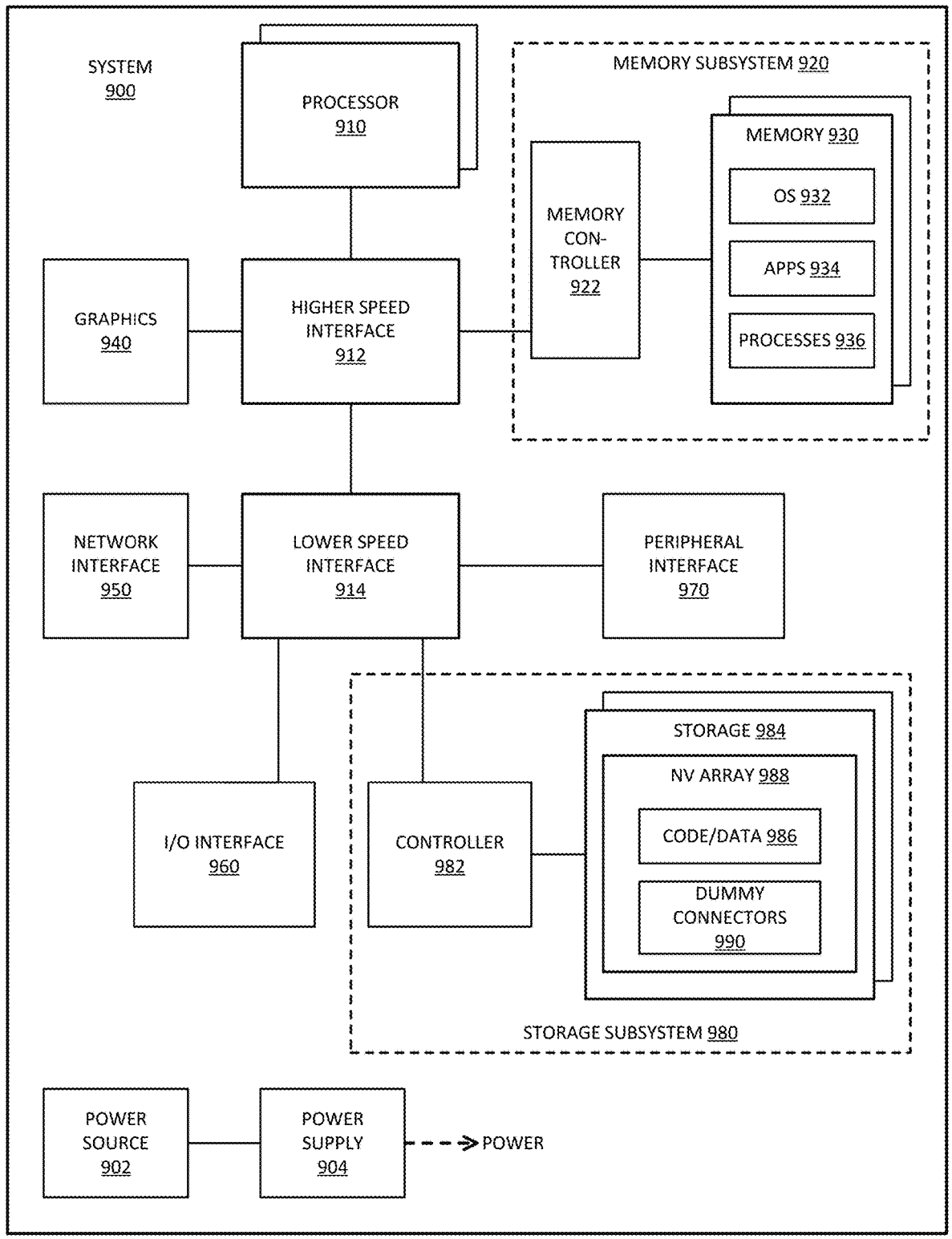
FIG. 9 is a block diagram of an example of a computing system in which nonvolatile media with dummy connectors in semi-isolated regions can be implemented.

FIG. 9 is a block diagram of an example of a computing system in which nonvolatile media with dummy connectors in semi-isolated regions can be implemented. System 900 represents a computing device in accordance with any example herein, and can be a laptop computer, a desktop computer, a tablet computer, a server, a gaming or entertainment control system, embedded computing device, or other electronic device. System 900 provides an example of a system that can incorporate a memory circuit in accordance with circuit 100 of FIG. 1.

In one example, system 900 includes storage 984 with NV array 988. NV array 988 can be, for example, a NAND array. NV array 988 includes one or more dummy connectors 990 close to wordline vertical connectors that would otherwise be semi-isolated. NV array 988 can implement dummy connectors 990 in accordance with any example herein. While shown in storage 984, it will be understood that for a byte-addressable NV memory, the NV array with dummy connectors could be included in memory 930.

System 900 includes processor 910 can include any type of microprocessor, central processing unit (CPU), graphics processing unit (GPU), processing core, or other processing hardware, or a combination, to provide processing or execution of instructions for system 900. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or a combination of such devices.

In one example, system 900 includes interface 912 coupled to processor 910, which can represent a higher speed interface or a high throughput interface for system components that need higher bandwidth connections, such as memory subsystem 920 or graphics interface components 940. Interface 912 represents an interface circuit, which can be a standalone component or integrated onto a processor die. Interface 912 can be integrated as a circuit onto the processor die or integrated as a component on a system on a chip. Where present, graphics interface 940 interfaces to graphics components for providing a visual display to a user of system 900. Graphics interface 940 can be a standalone component or integrated onto the processor die or system on a chip. In one example, graphics interface 940 can drive a high definition (HD) display or ultra high definition (UHD) display that provides an output to a user. In one example, the display can include a touchscreen display. In one example, graphics interface 940 generates a display based on data stored in memory 930 or based on operations executed by processor 910 or both.

Memory subsystem 920 represents the main memory of system 900, and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, 3DXP (three-dimensional crosspoint), or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910, such as integrated onto the processor die or a system on a chip.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 900 includes interface 914, which can be coupled to interface 912. Interface 914 can be a lower speed interface than interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can exchange data with a remote device, which can include sending data stored in memory or receiving data to be stored in memory.

In one example, system 900 includes one or more Input/Output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, 3DXP, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one example, storage subsystem 980 includes controller 982 to interface with storage 984. In one example controller 982 is a physical part of interface 914 or processor 910, or can include circuits or logic in both processor 910 and interface 914.

Power source 902 provides power to the components of system 900. More specifically, power source 902 typically interfaces to one or multiple power supplies 904 in system 900 to provide power to the components of system 900. In one example, power supply 904 includes an AC to DC (alternating current to direct current) adapter to plug into a wall outlet. Such AC power can be renewable energy (e.g., solar power) power source 902. In one example, power source 902 includes a DC power source, such as an external AC to DC converter. In one example, power source 902 or power supply 904 includes wireless charging hardware to charge via proximity to a charging field. In one example, power source 902 can include an internal battery or fuel cell source.

Figure 10:
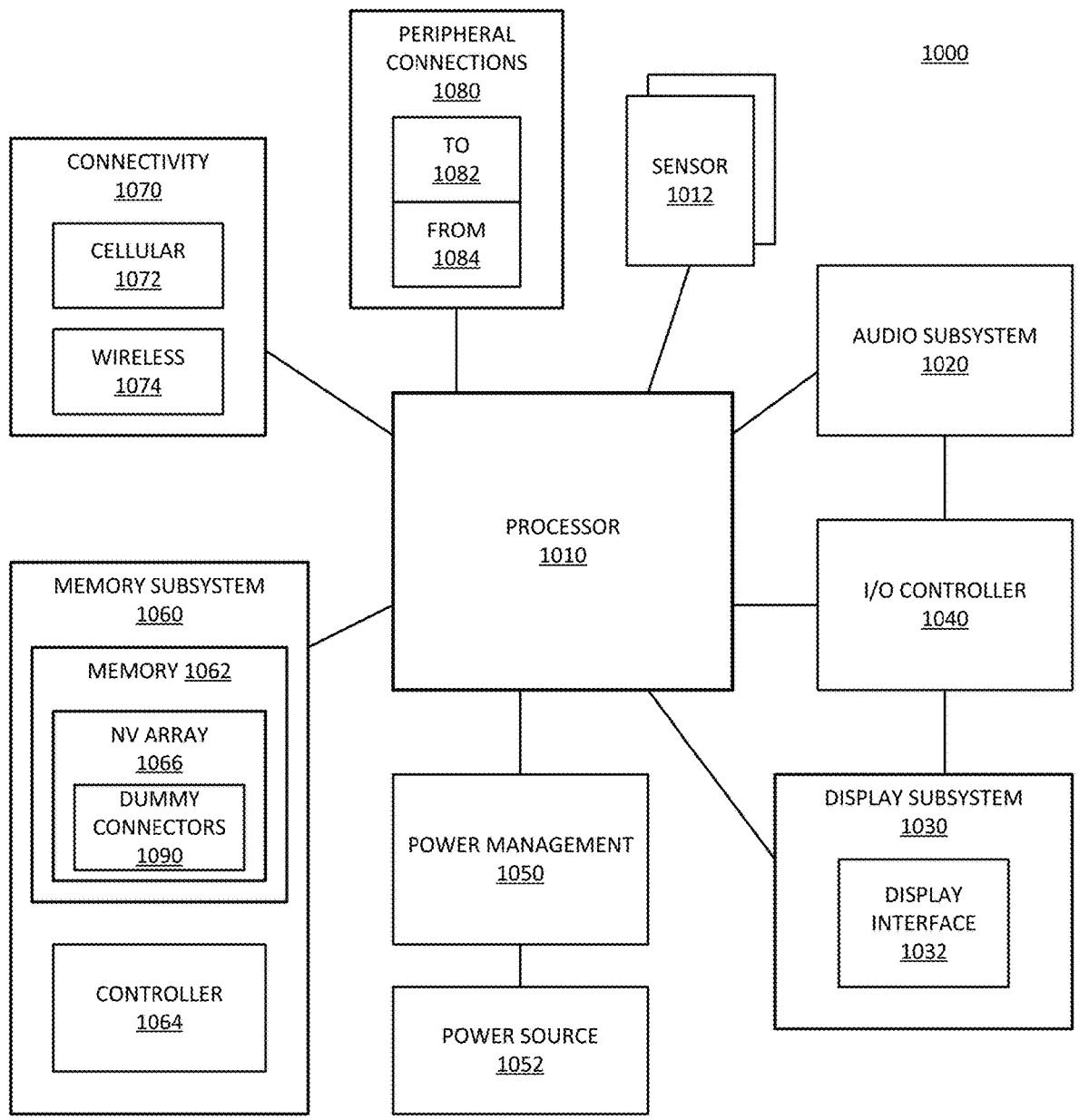
FIG. 10 is a block diagram of an example of a mobile device in which nonvolatile media with dummy connectors in semi-isolated regions can be implemented.

FIG. 10 is a block diagram of an example of a mobile device in which nonvolatile media with dummy connectors in semi-isolated regions can be implemented. System 1000 represents a mobile computing device, such as a computing tablet, a mobile phone or smartphone, wearable computing device, or other mobile device, or an embedded computing device. It will be understood that certain of the components are shown generally, and not all components of such a device are shown in system 1000. System 1000 provides an example of a system that can incorporate a memory circuit in accordance with circuit 100 of FIG. 1.

In one example, system 1000 includes memory 1062 with NV array 1066. NV array 1066 can be, for example, a NAND array. NV array 1066 includes one or more dummy connectors 1090 close to wordline vertical connectors that would otherwise be semi-isolated. NV array 1066 can implement dummy connectors 1090 in accordance with any example herein.

System 1000 includes processor 1010, which performs the primary processing operations of system 1000. Processor 1010 can include one or more physical devices, such as microprocessors, application processors, microcontrollers, programmable logic devices, or other processing means. The processing operations performed by processor 1010 include the execution of an operating platform or operating system on which applications and device functions are executed. The processing operations include operations related to I/O (input/output) with a human user or with other devices, operations related to power management, operations related to connecting system 1000 to another device, or a combination. The processing operations can also include operations related to audio I/O, display I/O, or other interfacing, or a combination. Processor 1010 can execute data stored in memory. Processor 1010 can write or edit data stored in memory.

In one example, system 1000 includes one or more sensors 1012. Sensors 1012 represent embedded sensors or interfaces to external sensors, or a combination. Sensors 1012 enable system 1000 to monitor or detect one or more conditions of an environment or a device in which system 1000 is implemented. Sensors 1012 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1012 can also include sensors for biometric systems such as fingerprint recognition systems, face detection or recognition systems, or other systems that detect or recognize user features. Sensors 1012 should be understood broadly, and not limiting on the many different types of sensors that could be implemented with system 1000. In one example, one or more sensors 1012 couples to processor 1010 via a frontend circuit integrated with processor 1010. In one example, one or more sensors 1012 couples to processor 1010 via another component of system 1000.

In one example, system 1000 includes audio subsystem 1020, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 1000, or connected to system 1000. In one example, a user interacts with system 1000 by providing audio commands that are received and processed by processor 1010.

Display subsystem 1030 represents hardware (e.g., display devices) and software components (e.g., drivers) that provide a visual display for presentation to a user. In one example, the display includes tactile components or touchscreen elements for a user to interact with the computing device. Display subsystem 1030 includes display interface 1032, which includes the particular screen or hardware device used to provide a display to a user. In one example, display interface 1032 includes logic separate from processor 1010 (such as a graphics processor) to perform at least some processing related to the display. In one example, display subsystem 1030 includes a touchscreen device that provides both output and input to a user. In one example, display subsystem 1030 includes a high definition (HD) or ultra-high definition (UHD) display that provides an output to a user. In one example, display subsystem includes or drives a touchscreen display. In one example, display subsystem 1030 generates display information based on data stored in memory or based on operations executed by processor 1010 or both.

I/O controller 1040 represents hardware devices and software components related to interaction with a user. I/O controller 1040 can operate to manage hardware that is part of audio subsystem 1020, or display subsystem 1030, or both. Additionally, I/O controller 1040 illustrates a connection point for additional devices that connect to system 1000 through which a user might interact with the system. For example, devices that can be attached to system 1000 might include microphone devices, speaker or stereo systems, video systems or other display device, keyboard or keypad devices, buttons/switches, or other I/O devices for use with specific applications such as card readers or other devices.

As mentioned above, I/O controller 1040 can interact with audio subsystem 1020 or display subsystem 1030 or both. For example, input through a microphone or other audio device can provide input or commands for one or more applications or functions of system 1000. Additionally, audio output can be provided instead of or in addition to display output. In another example, if display subsystem includes a touchscreen, the display device also acts as an input device, which can be at least partially managed by I/O controller 1040. There can also be additional buttons or switches on system 1000 to provide I/O functions managed by I/O controller 1040.

In one example, I/O controller 1040 manages devices such as accelerometers, cameras, light sensors or other environmental sensors, gyroscopes, global positioning system (GPS), or other hardware that can be included in system 1000, or sensors 1012. The input can be part of direct user interaction, as well as providing environmental input to the system to influence its operations (such as filtering for noise, adjusting displays for brightness detection, applying a flash for a camera, or other features).

In one example, system 1000 includes power management 1050 that manages battery power usage, charging of the battery, and features related to power saving operation. Power management 1050 manages power from power source 1052, which provides power to the components of system 1000. In one example, power source 1052 includes an AC to DC (alternating current to direct current) adapter to plug into a wall outlet. Such AC power can be renewable energy (e.g., solar power, motion based power). In one example, power source 1052 includes only DC power, which can be provided by a DC power source, such as an external AC to DC converter. In one example, power source 1052 includes wireless charging hardware to charge via proximity to a charging field. In one example, power source 1052 can include an internal battery or fuel cell source.

Memory subsystem 1060 includes memory device(s) 1062 for storing information in system 1000. Memory subsystem 1060 can include nonvolatile (state does not change if power to the memory device is interrupted) or volatile (state is indeterminate if power to the memory device is interrupted) memory devices, or a combination. Memory 1060 can store application data, user data, music, photos, documents, or other data, as well as system data (whether long-term or temporary) related to the execution of the applications and functions of system 1000. In one example, memory subsystem 1060 includes memory controller 1064 (which could also be considered part of the control of system 1000, and could potentially be considered part of processor 1010). Memory controller 1064 includes a scheduler to generate and issue commands to control access to memory device 1062.

Connectivity 1070 includes hardware devices (e.g., wireless or wired connectors and communication hardware, or a combination of wired and wireless hardware) and software components (e.g., drivers, protocol stacks) to enable system 1000 to communicate with external devices. The external device could be separate devices, such as other computing devices, wireless access points or base stations, as well as peripherals such as headsets, printers, or other devices. In one example, system 1000 exchanges data with an external device for storage in memory or for display on a display device. The exchanged data can include data to be stored in memory, or data already stored in memory, to read, write, or edit data.

Connectivity 1070 can include multiple different types of connectivity. To generalize, system 1000 is illustrated with cellular connectivity 1072 and wireless connectivity 1074. Cellular connectivity 1072 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 1074 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1080 include hardware interfaces and connectors, as well as software components (e.g., drivers, protocol stacks) to make peripheral connections. It will be understood that system 1000 could both be a peripheral device ("to" 1082) to other computing devices, as well as have peripheral devices ("from" 1084) connected to it. System 1000 commonly has a "docking" connector to connect to other computing devices for purposes such as managing (e.g., downloading, uploading, changing, synchronizing) content on system 1000. Additionally, a docking connector can allow system 1000 to connect to certain peripherals that allow system 1000 to control content output, for example, to audiovisual or other systems.

In addition to a proprietary docking connector or other proprietary connection hardware, system 1000 can make peripheral connections 1080 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general, with respect to the descriptions herein, in one example, a memory device includes: multiple wordlines stacked in a three-dimensional (3D) staircase stack, including a first wordline at an edge of the staircase stack with an adjacent wordline on one side and no adjacent wordline on an opposite side; and vertical connectors through an isolation layer on the 3D staircase stack to connect the wordlines of the 3D staircase stack with conductive lines in an access layer, the vertical connectors including at least one dummy vertical connector on the opposite side of the first wordline, wherein the dummy vertical connector does not electrically connect a wordline of the 3D staircase stack to a conductive line in the access layer.

In one example, the dummy vertical connector does not extend all the way through the isolation layer to the wordlines. In one example, the dummy vertical connector is to connect to a wordline in the 3D staircase stack and not connect to a conductive line in the access layer. In one example, the dummy vertical connector comprises a first dummy vertical connector, and further comprising a second dummy vertical connector, wherein the second dummy vertical connector does not electrically connect a wordline of the 3D staircase stack to a conductive line in the access layer. In one example, the first dummy vertical connector is positioned on the opposite side of the first wordline and the second dummy vertical connector is positioned on the one side of the first wordline. In one example, the first dummy vertical connector is positioned on the opposite side of the first wordline and the second dummy vertical connector is positioned on the opposite side of the first wordline. In one example, the memory device further includes a third dummy vertical connector, wherein the third dummy vertical connector does not electrically connect a wordline of the 3D staircase stack to a conductive line in the access layer, the third dummy vertical connector positioned on the one side of the first wordline. In one example, the first wordline is a top layer in a region of the 3D staircase stack. In one example, the first wordline is a bottom layer in a region of the 3D staircase stack. In one example, the dummy vertical connector has a smaller diameter than the vertical connectors that connect the wordlines of the 3D staircase stack with conductive lines in an access layer. In one example, the 3D staircase stack comprises a 3D stack of wordlines of a NAND flash memory device.

In general, with respect to the descriptions herein, in one example, a system includes: a nonvolatile (NV) memory controller; and multiple dies of NV memory coupled to the NV memory controller, the NV memory dies including multiple wordlines stacked in a three-dimensional (3D) staircase stack, including a first wordline at an edge of the staircase stack with an adjacent wordline on one side and no adjacent wordline on an opposite side; and vertical connectors through an isolation layer on the 3D staircase stack to connect the wordlines of the 3D staircase stack with conductive lines in an access layer, the vertical connectors including at least one dummy vertical connector on the opposite side of the first wordline, wherein the dummy vertical connector does not electrically connect a wordline of the 3D staircase stack to a conductive line in the access layer.

In one example, the dummy vertical connector does not extend all the way through the isolation layer to the wordlines. In one example, the dummy vertical connector comprises a first dummy vertical connector, and further comprising a second dummy vertical connector, wherein the second dummy vertical connector does not electrically connect a wordline of the 3D staircase stack to a conductive line in the access layer. In one example, the first dummy vertical connector is positioned on the opposite side of the first wordline and the second dummy vertical connector is positioned on the one side of the first wordline. In one example, the first dummy vertical connector is positioned on the opposite side of the first wordline and the second dummy vertical connector is positioned on the opposite side of the first wordline.

In one example, the NV memory dies further include a third dummy vertical connector, wherein the third dummy vertical connector does not electrically connect a wordline of the 3D staircase stack to a conductive line in the access layer, the third dummy vertical connector positioned on the one side of the first wordline. In one example, the first wordline is a top layer in a region of the 3D staircase stack. In one example, the first wordline is a bottom layer in a region of the 3D staircase stack. In one example, the dummy vertical connector has a smaller diameter than the vertical connectors that connect the wordlines of the 3D staircase stack with conductive lines in an access layer. In one example, the 3D staircase stack comprises a 3D stack of wordlines of a NAND (not AND) memory device. In one example, the system further includes one or more of: a host processor device coupled to the multiple dies; a display communicatively coupled to a host processor; a network interface communicatively coupled to a host processor; or a battery to power the system.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device comprising:
   multiple wordlines stacked in a three-dimensional (3D) staircase stack, including a first wordline at a top layer in a region of the 3D staircase stack and lower wordlines extending horizontally beyond an edge of the first wordline; and
   a plurality of vertical connectors extending at least partially within an isolation layer located over the 3D staircase stack, the plurality of vertical connectors including:
      multiple active pillars connected to the multiple wordlines and one or more conductive lines of an access layer, each active pillar connected to one of the multiple wordlines, including a first active pillar connected to the first wordline, the first active pillar having an adjacent active pillar on one side and no adjacent active pillar on an opposite side;
      at least one dummy vertical connector on the opposite side of the first active pillar, wherein the at least one dummy vertical connector is isolated from the multiple wordlines of the 3D staircase stack or the one or more conductive lines of the access layer; and
      a second dummy vertical connector distinct from the at least one dummy vertical connector, the second dummy vertical connector disposed on the one side of the first active pillar and between the first active pillar and a remainder of the multiple active pillars.

2. The memory device of claim 1, wherein the at least one dummy vertical connector does not extend all the way through the isolation layer to any of the multiple wordlines.

3. The memory device of claim 1, wherein the at least one dummy vertical connector is connected to a corresponding wordline in the 3D staircase stack and not connected to the access layer.

4. The memory device of claim 1, wherein the second dummy vertical connector is electrically decoupled from at least one of the 3D staircase stack and the access layer.

5. The memory device of claim 1, the plurality of vertical connectors further comprising a third dummy vertical connector, wherein the third dummy vertical connector is electrically decoupled from at least one of the 3D staircase stack and the access layer, the third dummy vertical connector also positioned on the one side of the first active pillar.

6. The memory device of claim 1, further comprising a second wordline at a bottom layer in a region of the 3D staircase stack.

7. The memory device of claim 1, wherein the at least one dummy vertical connector has a smaller diameter than the multiple active pillars that connect the wordlines of the 3D staircase stack with the access layer.

8. The memory device of claim 1, wherein the 3D staircase stack comprises a 3D stack of wordlines of a NAND flash memory device.

9. A system with memory, comprising:
   a nonvolatile (NV) memory controller; and
   multiple dies of NV memory coupled to the NV memory controller, the NV memory dies including
      multiple wordlines stacked in a three-dimensional (3D) staircase stack, including a first wordline at a top layer in a region of the 3D staircase stack and lower wordlines extending horizontally beyond an edge of the first wordline; and
      a plurality of vertical connectors extending at least partially within an isolation layer located over the 3D staircase stack, the plurality of vertical connectors including:
         multiple active pillars connected to the multiple wordlines and one or more conductive lines of an access layer, each active pillar connected to one of the multiple wordlines, including a first active pillar connected to the first wordline, the first active pillar having an adjacent active pillar on one side and no adjacent active pillar on an opposite side;
         at least one dummy vertical connector on the opposite side of the first active pillar, wherein the at least one dummy vertical connector is isolated from the multiple wordlines of the 3D staircase stack or the one or more conductive lines of the access layer; and
         a second dummy vertical connector distinct from the at least one dummy vertical connector, the second dummy vertical connector disposed on the one side of the first active pillar and between the first active pillar and a remainder of the multiple active pillars.

10. The system of claim 9, wherein the at least one dummy vertical connector does not extend all the way through the isolation layer to any of the multiple wordlines.

11. The system of claim 9, wherein the second dummy vertical connector is electrically decoupled from at least one of the 3D staircase stack and the access layer.

12. The system of claim 9, further comprising a third dummy vertical connector, wherein the third dummy vertical connector is electrically decoupled from at least one of the 3D staircase stack and the access layer, the third dummy vertical connector also positioned on the one side of the first active pillar.

13. The system of claim 9, further comprising a second wordline at a bottom layer in a region of the 3D staircase stack.

14. The system of claim 9, wherein the at least one dummy vertical connector has a smaller diameter than the multiple active pillars that connect the wordlines of the 3D staircase stack with the access layer.

15. The system of claim 9, wherein the 3D staircase stack comprises a 3D stack of wordlines of a NAND (not AND) memory device.

16. The system of claim 9, further comprising one or more of:
- a host processor device coupled to the multiple dies;
- a display communicatively coupled to a host processor;
- a network interface communicatively coupled to a host processor; or
- a battery to power the system.

17. The memory device of claim 7, wherein the smaller diameter of the at least one dummy vertical connector is based on a number of connectors of the at least one dummy vertical connector.

18. The memory device of claim 1, wherein the at least one dummy vertical connector has a more tapered profile than the multiple active pillars.

19. The system of claim 14, wherein the smaller diameter of the at least one dummy vertical connector is based on a number of connectors of the at least one dummy vertical connector.

20. The system of claim 9, wherein the at least one dummy vertical connector has a more tapered profile than the multiple active pillars.

* * * * *